United States Patent [19]

Roy

[11] Patent Number: 4,839,021

[45] Date of Patent: Jun. 13, 1989

[54] TREATMENT OF PETROLEUM DERIVED ORGANIC SLUDGES AND OIL RESIDUES

[75] Inventor: Christian Roy, St. Nicolas, Canada

[73] Assignee: Recherche Carbovac Inc., St-Nicolas, Canada

[21] Appl. No.: 131,432

[22] Filed: Dec. 11, 1987

Related U.S. Application Data

[63] Continuation-in-part of Ser. No. 876,071, Jun. 19, 1986, Pat. No. 4,740,270.

[30] Foreign Application Priority Data

Feb. 10, 1987 [CA] Canada ................................ 529379

[51] Int. Cl.$^4$ ............................................. C10G 17/00
[52] U.S. Cl. ........................................ 208/13; 208/46; 208/106; 208/131; 208/132; 208/184; 208/186; 208/344; 208/360; 208/370
[58] Field of Search ................ 208/13, 106, 131, 132, 208/46, 184, 186, 347, 360, 370

[56] References Cited

U.S. PATENT DOCUMENTS

| 1,586,801 | 6/1926 | Hechenbleikner et al. | 208/13 |
| 1,763,604 | 6/1930 | Hurnsberger | 208/106 |
| 2,041,957 | 5/1936 | Reis | 208/13 |
| 2,372,186 | 3/1945 | Chaney | 208/106 |

*Primary Examiner*—Helen M. S. Sneed
*Assistant Examiner*—Helane Myers
*Attorney, Agent, or Firm*—Foley & Lardner, Schwartz, Jeffery, Schwaab, Mack, Blumenthal & Evans

[57] ABSTRACT

A method of producing pyrolytic oils suitable for petroleum reprocessing is disclosed. According to the invention, petroleum derived organic sludges or oil residues in a solid/liquid phase are subjected to vacuum pyrolysis under temperature and sub-atmospheric pressure conditions such as to prevent gas and vapor phase secondary cracking reactions and to thereby increase the yield of pyrolytic oils to the detriment of hydrocarbon gases. About 97% of the organic matter content of the sludges and about 75% of the organic matter content of the oil residues can be converted into pyrolytic oils suitable for petroleum reprocessing.

7 Claims, 4 Drawing Sheets

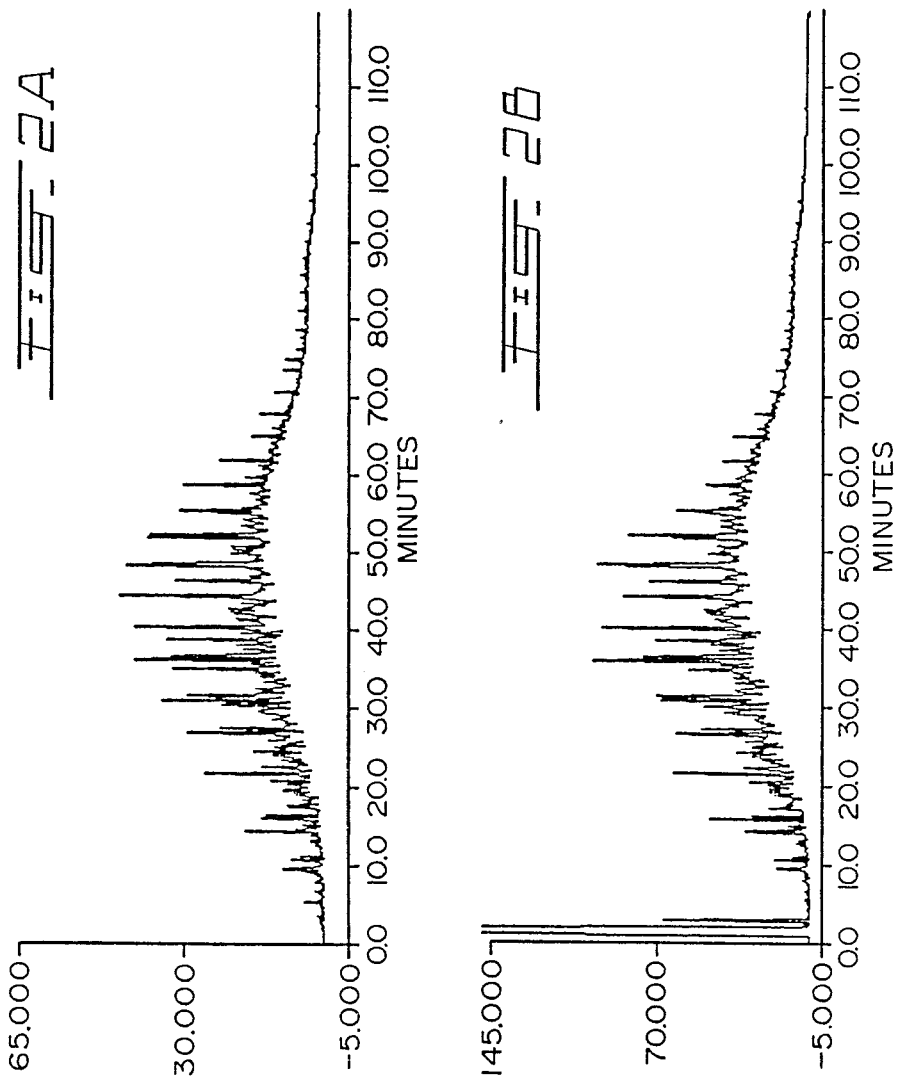

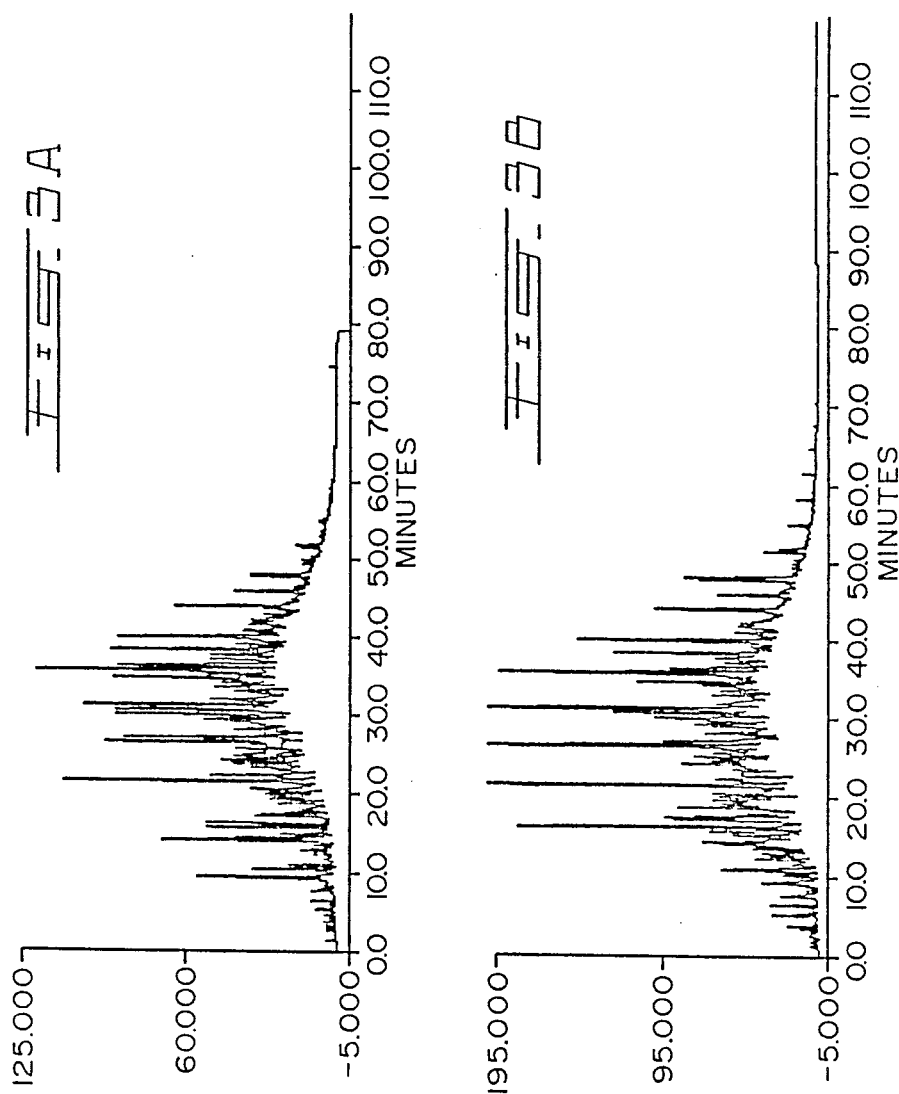

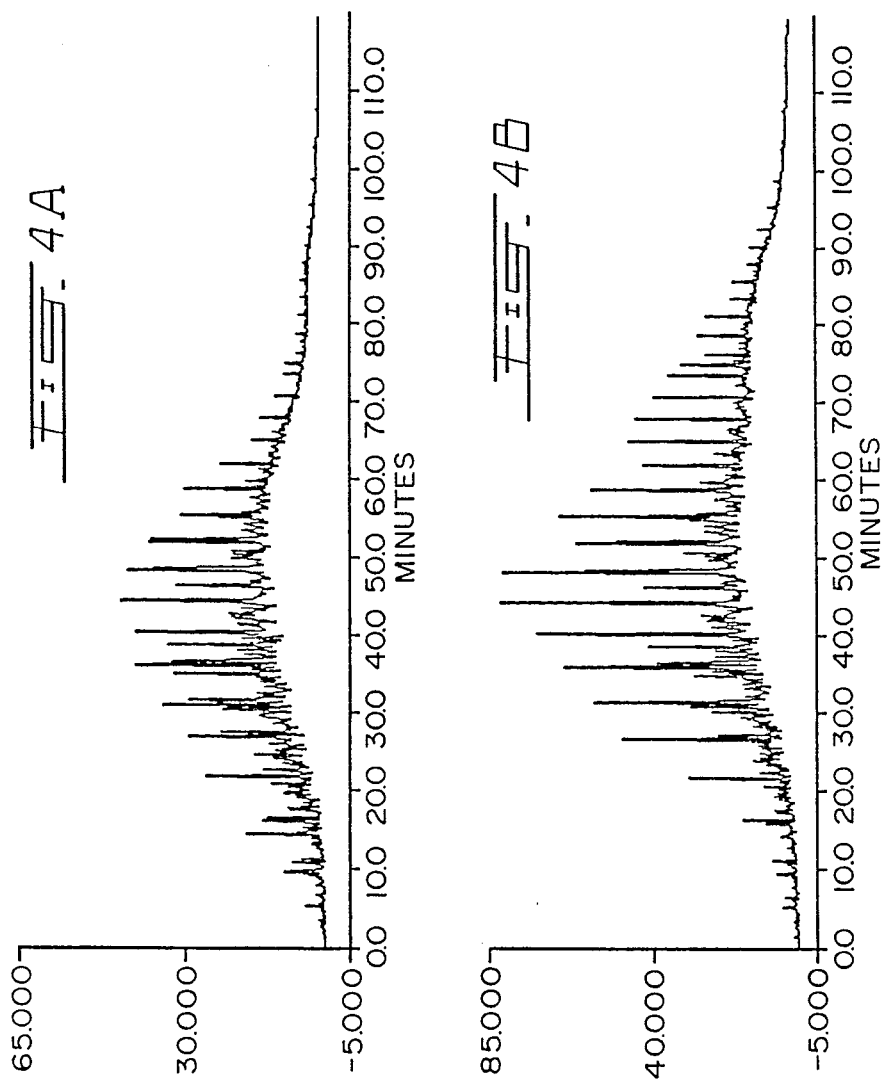

TREATMENT OF PETROLEUM DERIVED ORGANIC SLUDGES AND OIL RESIDUES

This application is a continuation-in-part of co-pending application Ser. No. 876,071, filed June 19, 1986 and now U.S. Pat. No. 4,740,270.

The present invention relates to a method of treating petroleum derived organic sludges and oil residues.

The treatment of organic sludges derived from the biodegradation units of petroleum industries presents a major problem for such a type of industry. Such organic sludges are also termed activated sludges when the biodegradation is conducted under aerobic conditions; on the other hand, when the biodegradation is carried out under anaerobic conditions, the sludges are referred to as biological sludges. Due to their solid/liquid nature, these sludges cannot be treated by conventional distillation techniques to obtain useful products and therefore they must be disposed of at considerable cost generally by incineration.

Oil residues which have a higher content of inorganic matter (e.g. sand) but a lesser content of water than organic sludges of petroleum origin also presents a similar disposal problem. Such oil residues can be for example spilled hydrocarbon oils which are removed together with sand used to limit the oil spill.

Applicant has already proposed in the aforesaid application a process for the treatment of used rubber tires by vacuum pyrolysis to produce liquid and gaseous hydrocarbons and a solid carbonaceous material, the liquid hydrocarbons produced being suitable for use as heating fuel. According to this process, the pyrolysis of the tires is carried out at a temperature in the range of about 360° C. to about 415° C., under a sub-atmospheric pressure of less than about 35 mm Hg and such that the gases and vapors produced in the reactor have a residence time of the order of a few seconds. In this manner, the formation of liquid hydrocarbons is promoted so that high yields of hydrocarbon oils are obtained.

It has now been found quite unexpectedly that petroleum derived organic sludges and oil residues can also be treated by vacuum pyrolysis, to produce pyrolytic oils which are suitable for reprocessing in petroleum refineries.

Accordingly, the present invention provides a method of treating petroleum derived organic sludges and oil residues, which comprises subjecting the organic sludges or oil residues to vacuum pyrolysis under temperature and sub-atmospheric pressure conditions such as to produce pyrolytic oils suitable for petroleum reprocessing.

The desired pyrolytic oils are advantageously obtained by carrying the pyrolysis of the organic sludges or oil residues at a temperature in the range of about 380° C. to about 450° C., preferably at about 410° C., and under a sub-atmospheric pressure of less than about 50 mm Hg (absolute pressure). Operating at a temperature of about 410° C. has been found to promote the formation of the pyrolytic oils, thereby significantly increasing the yield thereof.

According to a preferred embodiment of the invention, the organic sludges or oil residues are fed to a reactor, the pressure within the latter is reduced to about 5 mm Hg (absolute pressure) and the feed material is then gradually heated up to about 410° C. The material is maintained at such a temperature and under a sub-atmospheric pressure not exceeding about 50 mm Hg (absolute pressure) until substantially complete conversion of the organic matter content of the sludges or oil residues into pyrolytic oils. The condensable pyrolytic vapors generated as a result of the pyrolysis are withdrawn from the reactor and passed through suitable heat exchanger units to condense and thereby provide the desired pyrolytic oils.

The method according to the invention is non-destructive and thus enables one to convert about 97% of the organic matter content of the sludges and about 75% of the organic matter content of the oil residues, into pyrolytic oils suitable for petroleum reprocessing. The sterile residual solid which is obtained as a secondary product in the method of the invention and which is composed mostly of inorganic matter such as sand can be safely disposed of by burial underground, without contaminating the environment.

Further features and advantages of the invention will become more readily apparent from the following description of preferred embodiments, with reference to the appended drawings, in which:

FIG. 2A and 2B are chromatograms respectively of the pyrolytic oils obtained at 497° C. from an oil residue sample of the oils extracted with dichloromethane from the same sample;

FIG. 3A and 3B are chromatograms respectively of the pyrolytic oils obtained at 108° C. from an oil residue sample and of commercial diesel fuel; and FIGS. 4A and 4B are chromatograms respectively of the pyrolytic oils obtained from an oil residue sample and of the pyrolytic oils obtained from an activated sludge sample.

Figure 1:
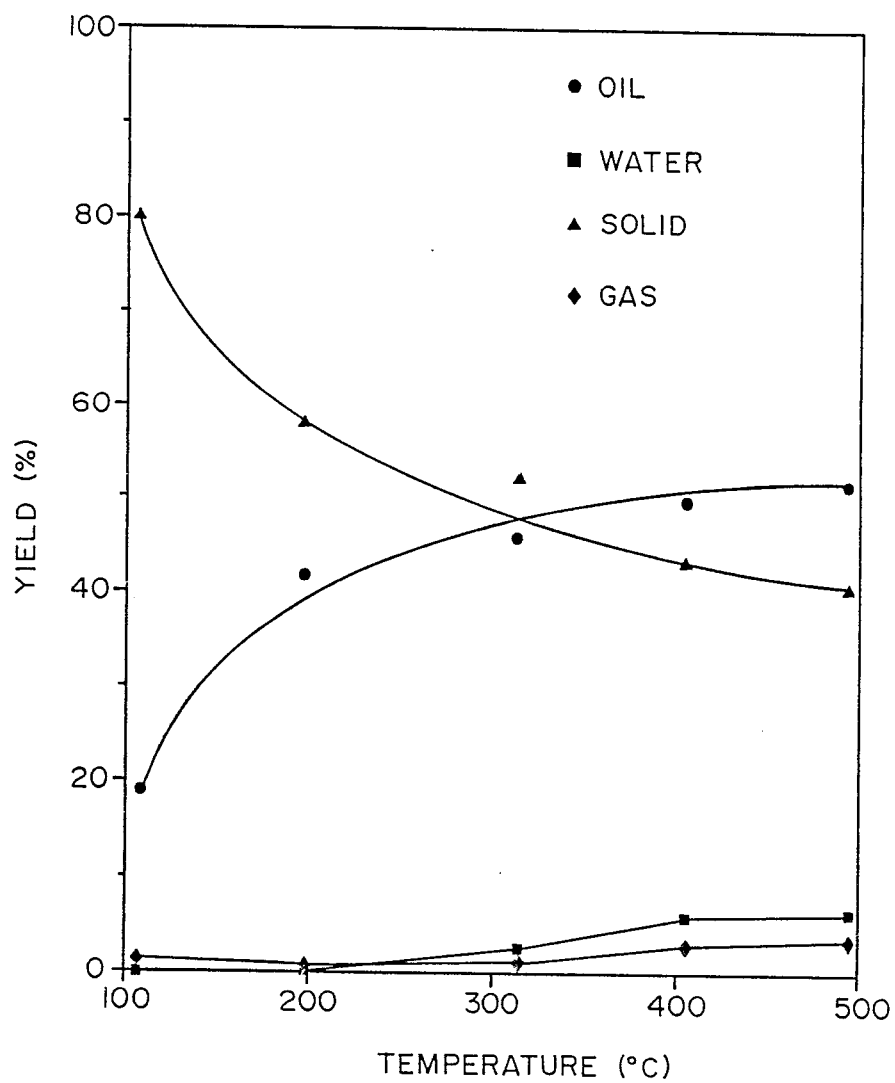
FIG. 1 is a plot of the product yield as a function of temperature, in a method according to the invention.

An oil residue sample containing about 34 weight % organic matter, about 51 weight % inorganic matter and about 15 weight % water was subjected to vacuum pyrolysis and the pyrolytic products were analysed for their composition as a function of temperature. The following results were obtained, as calculated on moisture and ash free basis:

TABLE 1

| Temperature (°C.) | Yields (weight)% | | | |
| --- | --- | --- | --- | --- |
| | Pyrolytic Oils | Total Water | Residual Solids | Gases |
| 108 | 18.8 | 0.0 | 80.2 | 1.0 |
| 198 | 41.7 | 0.0 | 57.7 | 0.6 |
| 316 | 45.6 | 1.9 | 51.8 | 0.7 |
| 407 | 49.3 | 5.7 | 43.0 | 2.0 |
| 497 | 50.8 | 6.0 | 40.4 | 2.8 |

The above data is reported in FIG. 1. As shown, substantially maximum production of pyrolytic oils is obtained in the temperature range of about 380°–450° C., the optimum temperature being about 410° C.

The chemical analysis of the pyrolytic oils produced at the above temperature is as follows:

TABLE 2

| T (°C.) | Elementary Analysis | | | | | Humidity (%) | Calorific Value (kcal kg$^{-1}$) |
| --- | --- | --- | --- | --- | --- | --- | --- |
| | C | H | N | S | O | | |
| 108 | 85.8 | 13.2 | 0.7 | 0.3 | 0.0 | 0.0 | 11,190 |
| 198 | 85.9 | 13.1 | 0.4 | 0.6 | 0.0 | 0.1 | 11,060 |
| 316 | 85.5 | 13.0 | 0.9 | 0.6 | 0.0 | 0.3 | 11,020 |
| 407 | 86.3 | 12.9 | 0.2 | 0.6 | 0.0 | 0.1 | 10,800 |
| 497 | 85.7 | 12.8 | 0.9 | 0.6 | 0.0 | 0.1 | 10,850 |

The above data show that the pyrolytic oils are similar to unrefined petroleum, the oils being rich in carbon and hydrogen with a total content in nitrogen, sulfur and oxygen of less than 2%. The pyrolytic oils have a moisture content which is negligable and a high calorific value which decreases slightly as the temperature of the pyrolysis increases.

For the purpose of comparison, the same oil residue sample was extracted with dichloromethane using a soxhlet. The oils extracted from the sample were analysed by gas chromatography and the chromatogram thereof was compared with that of the oils obtained by vacuum pyrolysis at 497° C. As shown in FIGS. 2A and 2B, the pyrolytic oils are similar in structure to the oils obtained by non-destructive methods, such as by soxhlet extraction. This comparative test clearly shows that the method according to the invention is also non-destructive.

The pyrolytic oils produced at 108° C. were also compared by gas chromatography with commercial diesel fuel. As shown in FIGS. 3A and 3B, both are composed of elements having similar boiling points.

The pyrolytic oils obtained from the oil residue sample were further tested for their suitability to being reprocessed in petroleum refineries. The following results were obtained:

| | |
|---|---|
| API Gravity (ASTM D1298) | 29.0° |
| Specific Gravity | 0.8816 |
| Flash Point (ASTM D93) | 178° F. |
| Sulphur | 0.90% |
| B.S. & W. (ASTM D4007) | 0.20% |
| Viscosity @ 100° F., Kinematic | 0.0716 Stokes |
| Ramsbottom Carbon Residue (ASTM D524) | 0.13% |
| Distillation (ASTM D86) | |
| IBP | 486° F. |
| 5% | 505 |
| 10% | 520 |
| 20% | 539 |
| 30% | 555 |
| 40% | 574 |
| 50% | 594 |
| 60% | 617 |
| 70% | 644 |
| 80% | 686 |
| 90% | 746 |
| 93% | 760 |
| (Residue Breakdown) | |

The metals identified in the pyrolytic oils produced at 407° C. were the following:

TABLE 3

| Metals | Concentration (ppm) |
|---|---|
| Vanadium | 3 |
| Nickel | 0.3 |
| Sodium | 330 |

TABLE 3-continued

| Metals | Concentration (ppm) |
|---|---|
| Copper | 0.8 |
| Iron | 6.8 |

The above data clearly show that the oils produced by vacuum pyrolysis from oil residues are suitable for petroleum reprocessing. The concentration of V, Ni, Cu and Fe metals which could act as catalyst poisons are within the acceptable limits. The concentration of Na which must be lower than 1 ppm to avoid catalyst poisoning can be reduced by a desalting process such as that normally encountered in petroleum refining.

An organic sludge sample containing about 34 weight % organic matter, about 3 weight % inorganic matter and about 63 weight % water was similarly treated by vacuum pyrolysis. The pyrolytic oils produced from the sample were analysed by gas chromatography and the chromatogram thereof was compared with that of the pyrolytic oils produced from the aforesaid oil residue sample. As shown in FIGS. 4A and 4B, the pyrolytic oils produced from both samples are essentially the same. The peaks representative of $C_9$–$C_{20}$ hydrocarbons are easily identified.

I claim:

1. A method of producing pyrolytic oils suitable for petroleum reprocessing, which comprises subjecting petroleum-derived organic sludges or oil residues in a solid/liquid phase to vacuum pyrolysis under temperature and sub-atmospheric pressure conditions such as to prevent gas and vapor phase secondary cracking reactions and thereby to increase the yield of pyrolytic oils to the detriment of hydrocarbon gases.

2. A method as claimed in claim 1, wherein the pyrolysis is carried out at a temperature in the range of about 380° C. to about 450° C. and under a sub-atmospheric pressure of less than about 50 mm Hg (absolute pressure).

3. A method as claimed in claim 2, wherein said temperature is about 410° C.

4. A method as claimed in claim 1, wherein the organic sludges or oil residues are gradually heated up to a temperature in the range of about 380° C. to about 450° C., under a sub-atmospheric pressure of about 5 mm Hg (absolute pressure), and maintained at said temperature while under a sub-atmospheric pressure not exceeding about 50 mm Hg (absolute pressure) until substantially complete conversion of the content in organic matter of said organic sludges or oil residues into said pyrolytic oils.

5. A method as claimed in claim 4, wherein said temperature is about 410° C.

6. A method as claimed in claim 2, wherein said organic sludges contain organic matter and about 97% of said organic matter is converted into said pyrolytic oils.

7. A method as claimed in claim 2, wherein said oil residues contain organic matter and about 75% of said organic matter is converted into said pyrolytic oils.

* * * * *